United States Patent
Mendelson et al.

(10) Patent No.: US 10,860,778 B2
(45) Date of Patent: Dec. 8, 2020

(54) SYSTEM, METHOD, AND SOFTWARE APPLICATION FOR ENABLING A USER TO VIEW AND INTERACT WITH A VISUAL MAP IN AN EXTERNAL APPLICATION

(71) Applicant: COREL CORPORATION, Ottawa (CA)

(72) Inventors: Neil S. Mendelson, Foster City, CA (US); William J. Creekbaum, San Mateo, CA (US); Andriy O. Mochalskyy, San Francisco, CA (US)

(73) Assignee: Corel Corporation, Ottawa (CA)

( * ) Notice: Subject to any disclaimer, the term of this patent is extended or adjusted under 35 U.S.C. 154(b) by 76 days.

(21) Appl. No.: 15/212,796

(22) Filed: Jul. 18, 2016

(65) Prior Publication Data
US 2016/0328362 A1 Nov. 10, 2016

Related U.S. Application Data

(63) Continuation of application No. 12/291,515, filed on Nov. 10, 2008, now Pat. No. 9,396,455.

(51) Int. Cl.
*G06F 17/27* (2006.01)
*G06F 40/103* (2020.01)
(Continued)

(52) U.S. Cl.
CPC .......... *G06F 40/103* (2020.01); *G06F 3/0484* (2013.01); *G06F 16/29* (2019.01);
(Continued)

(58) Field of Classification Search
CPC .. G06F 17/24; G06F 17/243; G06F 17/30241; G06F 21/6209; G06F 8/60;
(Continued)

(56) References Cited

U.S. PATENT DOCUMENTS

| 5,257,185 A | 10/1993 | Farley et al. |
| 5,327,529 A | 7/1994 | Fults et al. |

(Continued)

FOREIGN PATENT DOCUMENTS

| EP | 0784263 A1 | 7/1997 |
| EP | 1615145 A2 | 1/2006 |

OTHER PUBLICATIONS

Northcode, 'Renaming the Projector', publisher: Northcode.com, published: Apr. 2004, R-p. 1-4, M-p. 1-6, FSPAGE 1 (Year: 2004).*

(Continued)

*Primary Examiner* — Wilson W Tsui
(74) *Attorney, Agent, or Firm* — Rosenberg, Klein & Lee

(57) ABSTRACT

The present invention provides a system, method, and software program for enabling a user to view and interact with a visual map in an external application. According to one embodiment of the invention, a visual mapping application creates a file with (i) visual map data and (ii) software code capable of being executed by an external application to display the visual map and provide select visual mapping application in the external application. In one embodiment, such functionality includes the ability to expand and collapse map topics, scroll the map, zoom in and out, follow hypertext links in the map, find content in the map, and print the map. The created file can be thought of as a "visual map player" in that an external application can "play" the created file, resulting in a live map in the external application.

31 Claims, 9 Drawing Sheets

(51) Int. Cl.

| | |
|---|---|
| *G06F 16/29* | (2019.01) |
| *G06F 40/14* | (2020.01) |
| *G06F 40/134* | (2020.01) |
| *G06F 40/166* | (2020.01) |
| *G06F 40/186* | (2020.01) |
| *G06Q 10/10* | (2012.01) |
| *G06F 3/0484* | (2013.01) |
| *G06T 11/20* | (2006.01) |

(52) U.S. Cl.
CPC ............ *G06F 40/134* (2020.01); *G06F 40/14* (2020.01); *G06F 40/166* (2020.01); *G06F 40/186* (2020.01); *G06Q 10/10* (2013.01); *G06T 11/206* (2013.01)

(58) Field of Classification Search
CPC .... G06F 9/44521; G06F 40/103; G06F 16/29; G06F 40/14; G06F 40/134; G06F 40/166; G06F 40/186; G06F 10/10; G06F 3/0484; G06F 11/206; G06F 9/4452; G06T 11/206
See application file for complete search history.

(56) References Cited

U.S. PATENT DOCUMENTS

| | | | |
|---|---|---|---|
| 5,341,223 A | 8/1994 | Shigeeda et al. | |
| 5,546,529 A | 8/1996 | Bowers et al. | |
| 5,548,749 A | 8/1996 | Kroenke et al. | |
| 5,555,357 A | 9/1996 | Fernandes et al. | |
| 5,597,312 A | 1/1997 | Bloom et al. | |
| 5,619,694 A | 4/1997 | Shimazu | |
| 5,627,979 A | 5/1997 | Chang et al. | |
| 6,101,510 A * | 8/2000 | Stone | G06F 17/30873 715/234 |
| 6,687,878 B1 * | 2/2004 | Eintracht | G06F 17/241 707/E17.117 |
| 7,640,512 B1 * | 12/2009 | Appling | G06F 17/30905 715/760 |
| 8,966,135 B2 * | 2/2015 | Tchapda | G06F 3/067 710/33 |
| 2001/0049297 A1 * | 12/2001 | Hibscher | A63F 13/12 463/9 |
| 2002/0067353 A1 * | 6/2002 | Kenyon | G06F 17/30241 345/419 |
| 2006/0285152 A1 * | 12/2006 | Skillen | G06F 17/30241 358/1.15 |
| 2008/0281848 A1 * | 11/2008 | Corbett | G06F 17/30241 |
| 2008/0301643 A1 * | 12/2008 | Appleton | G06Q 30/02 717/124 |

OTHER PUBLICATIONS

TalkGraphics, "Flash in PowerPoint?", published: Feb. 1 2007, pp. 1-5) (Year: 2007).*

TechTalkz, "How do I insert a flash file into Word, so when it opens it plays", published: October 2007, pp. 1-4) (Year: 2007).*

Warner, (Adding Flash Files to a Webpage in Dreamweaver, published: Jul. 9, 2008, pp. 1-17) (Year: 2008).*

MindjetManager6 (Mindjet Manager 6—Users Guide, published: 2005, XP-002481935, pp. 4, 13, 15, 19, 36, 37, 99, 109, 147, 152, 153, 221,250).

* cited by examiner

SYSTEM, METHOD, AND SOFTWARE APPLICATION FOR ENABLING A USER TO VIEW AND INTERACT WITH A VISUAL MAP IN AN EXTERNAL APPLICATION

RELATED APPLICATIONS

This application is a continuation of U.S. patent application Ser. No., 12/291,515, filed on Nov. 10, 2008. The foregoing parent application is incorporated by reference as if fully disclosed herein.

BACKGROUND OF THE INVENTION

1. Field of the Invention

This invention relates generally to visual mapping systems, and, more particularly, to enabling a user to view and interact with a visual map in an external application.

2. Description of the Background Art

A visual map is a diagram that represents ideas and/or information in topics. Examples of visual maps are mind maps, topic maps, semantic networks, and concept maps. Visual maps are increasingly used to help people generate, classify, and/or organize ideas and information and to see such ideas and information in a hierarchical, visual layout. Visual maps are used for project management, work-flow analysis, organizational charts, and other purposes.

FIG. 1 is an example of a visual map for information related to a wireless communication project meeting. The visual map in FIG. 1 is a mind map. Mind maps are made up of hierarchically-arranged topics. The main topics in FIG. 1 are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation." Users typically create topics in a visual map by inserting or importing text and graphic elements into topics.

Users typically create visual maps using proprietary visual mapping software. Mindjet LLC'S MINDMANGER® software is an example of such software.

One limitation users of visual maps currently face is that in order for a user to share a visual map with other users, the other users have to have visual mapping software capable of opening and interacting with the visual map. While current technology allows visual maps to be saved as PDF files, such files are static files. A user viewing the PDF file is not able to interact with the map (e.g., expand and collapse topics).

Therefore, there is a desire to be able to share visual maps with users that do not have a proprietary visual mapping application, where the recipients of the map can interact with the visual map using an external application (i.e., a non-visual mapping application). For example, it would be desirable to enable a user to view and interact with a map in PDF file or in a web browser.

SUMMARY

The present invention provides a system, method, and software program for enabling a user to view and interact with a visual map in an external application. According to one embodiment of the invention, a visual mapping application (executing on a computer) receives a request to create a visual map file that can be executed within an external application. The visual mapping application then retrieves the applicable visual map data. Such visual map data may be obtained from a map stored by the visual mapping application, or it may be obtained from an external source, such as a web service. The visual mapping application creates a file that includes both the visual map data and software code with visual mapping application functionality.

The software code in the created file is capable of being executed in an external application to display the visual map and provide select visual mapping functionality. The created file can be thought of as a "visual map player" in that an external application can "play" the created file, resulting in a live map in the external application. The ways in which a user can interact with the visual mapping application can vary greatly and depend on the functionality built into the software code included in the created file. In the preferred embodiment, such functionality includes the ability to expand and collapse map topics, scroll the map, zoom in and out, follow hypertext links in the map, find content in the map, and print the map. Other types of functionality that can be built into the created file include the ability to edit a visual map, including adding, deleting, and moving topics.

In an alternate embodiment of the invention, the created file does not include all the visual map data necessary to display the visual map. Instead it includes a link to a network address from which visual map data can be obtained, such as a network address associated with a web service or a visual mapping server. This enables the created file to obtain the most recent version of the visual map without altering the created file.

In another alternate embodiment, the created file includes an application programming interface to the external application. The external application generates visual map data and initializes the created file with the visual map data. Software code in the created file displays the data in a visual map within the external application.

DETAILED DESCRIPTION OF THE PREFERRED EMBODIMENTS

The present invention provides a system and method for enabling a user to view and interact with a visual map in an external application. As used herein, an external application is any application that is not a visual mapping application. A visual mapping application, such as Mindjet LLC's MINDMANAGER, is an application specifically designed to provide visual mapping functionality. Examples of external applications include PDF applications (e.g., ADOBE ACROBAT), word processing applications (e.g., MICROSOFT WORD), spreadsheet applications (e.g., MICROSOFT EXCEL), slide presentation applications (e.g., MICROSOFT POWERPOINT), computer-aided drawing applications (e.g., MICROSOFT VISIO), and web browsers.

Figure 1:
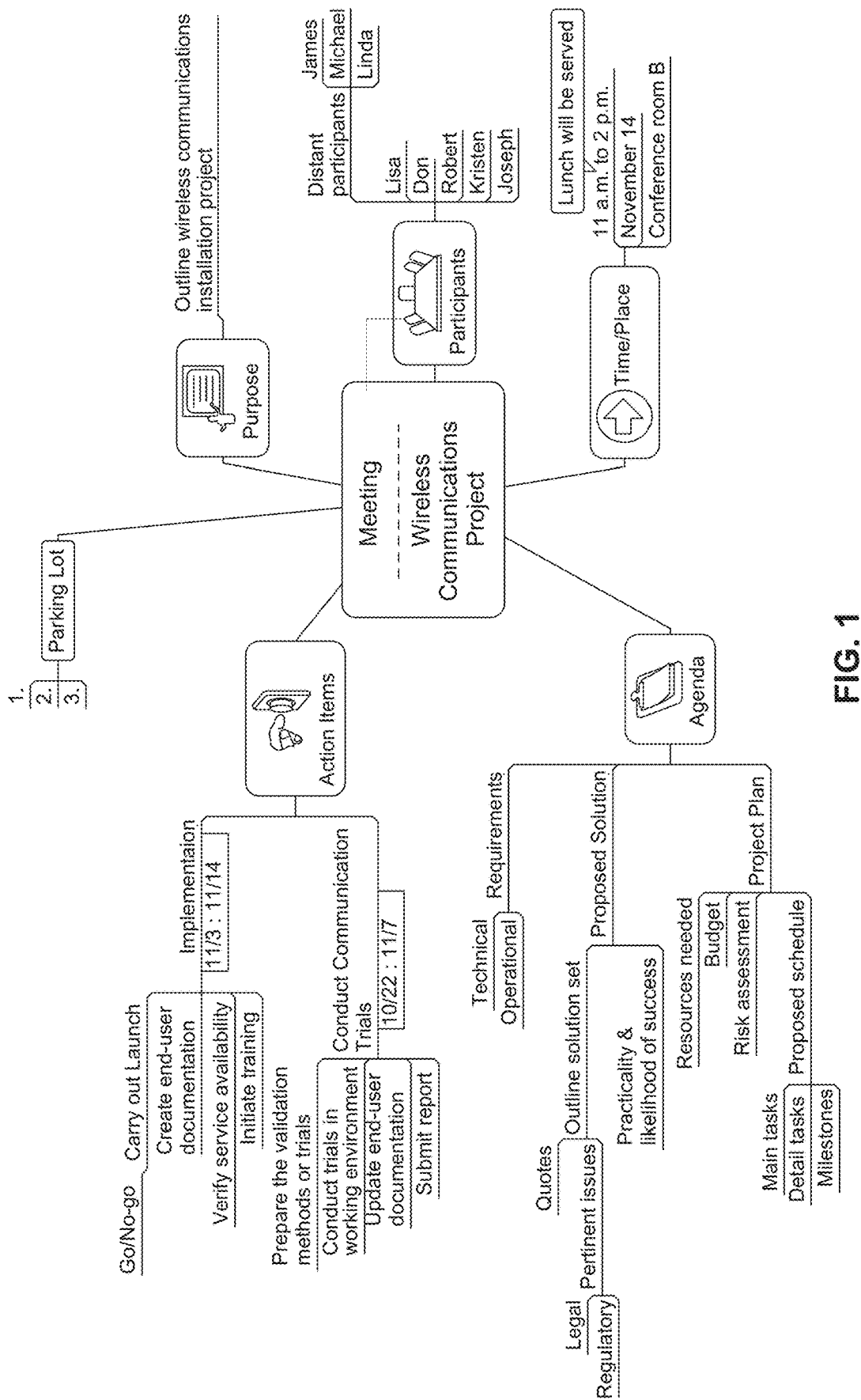
FIG. 1 is an example of a mind map.
Figure 2:
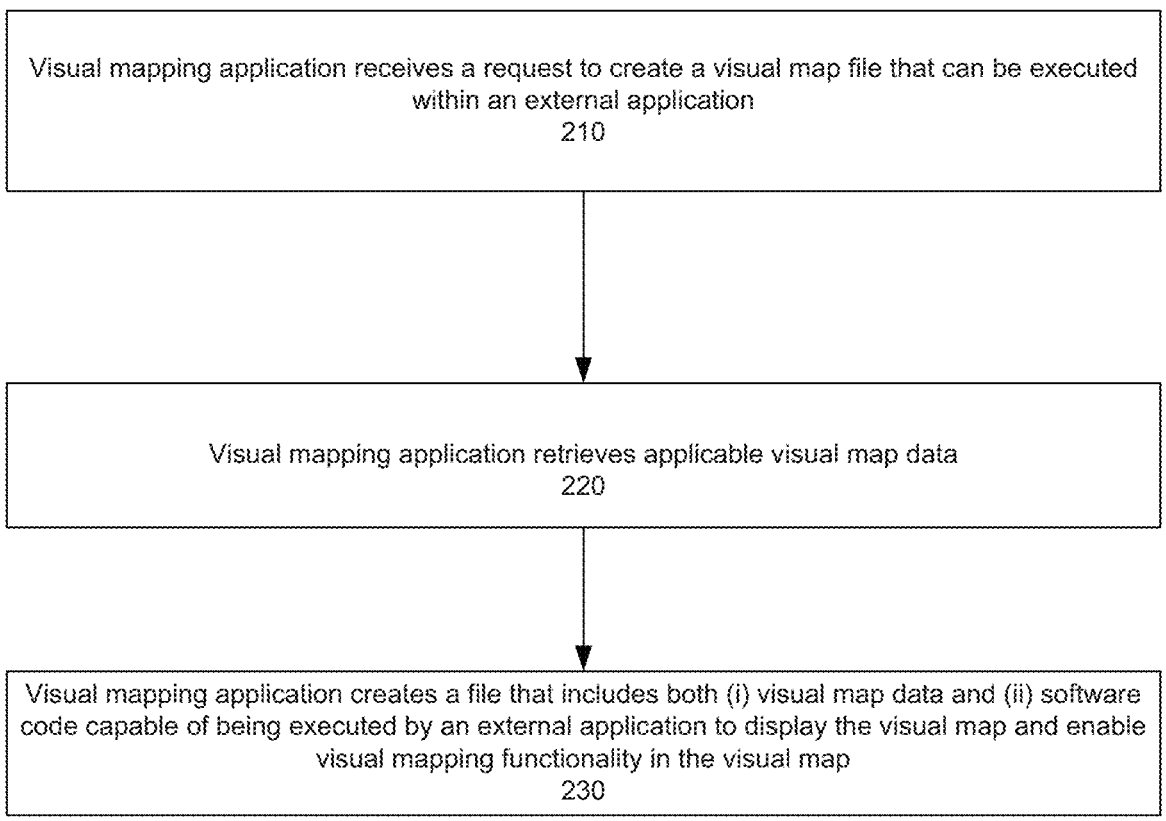
FIG. 2 is a flowchart that illustrates a method, according to one embodiment of the present invention, for enabling a visual map to be viewed and interacted with in an external application.

FIG. 2 illustrates a method for enabling a visual map to be viewed and interacted with in an external application. According to such method, a visual mapping application receives a request to create a map file that can be executed within an external application (step 210). Such request may be initiated by a user of the visual mapping application, or may be a request from another software application. The visual mapping application then retrieves the applicable visual map data (step 220), and creates a file that includes both the visual map data and software code with visual mapping application functionality (step 230).

The software code in the created file is capable of being executed in an external application to display the visual map and provide select visual mapping functionality. The created file can be thought of as a "visual map player" in that an external application can "play" the created file, resulting in a "live" (i.e., non-static) map in the external application. Consequently, the created file is referred to herein as a "player file." The ways in which a user can interact with the visual mapping application can vary greatly and depend on the functionality built into the software code included in the player file. In the preferred embodiment, such functionality includes the ability to expand and collapse map topics, scroll the map, zoom in and out, follow hypertext links in the map, find content in the map, and print the map. Other types of functionality that can be built into the player file include the ability to edit a visual map, including adding, deleting, and moving topics.

Figure 3:
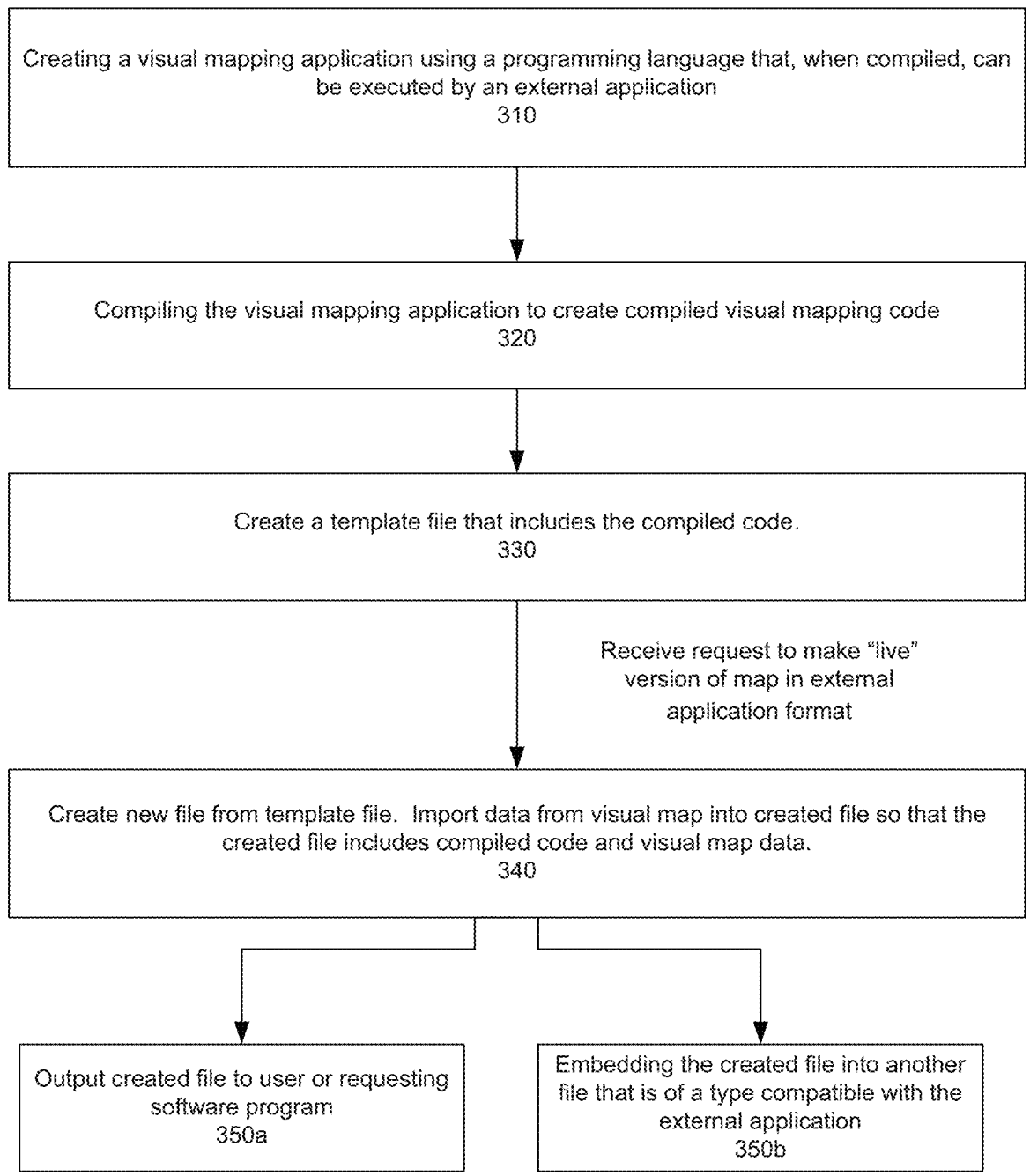
FIG. 3 is a flowchart that illustrates an example of one way in which the method of FIG. 2 can be implemented.

FIG. 3 illustrates an example of one way in which the method of FIG. 2 can be implemented. In such example, a software developer writes visual mapping software code in a programming language that, when compiled, can be executed by the host external application (step 310). The visual mapping code has the ability to display a visual map and perform select, additional visual mapping functions. In one embodiment, the additional visual mapping functionality is the ability to expand and collapse map topics, scroll the map, zoom in and out, follow hypertext links in the map, find content in the map, and print the map. In the preferred embodiment, the visual mapping code created by the software developer is a "mini" or stripped-down version of a fully functional visual mapping application, such as Mindjet LLC's MINDMANAGER.

The software developer compiles the visual mapping code (320) and creates a template file that includes the compiled code (330). The template file includes a space for visual map data. Such space is referred to herein as the "data payload." The compiled code will act upon map data stored in the data payload.

In response to the visual mapping application receiving a request (from either a user or other software application) to make a live version of a visual map in an external application format, the visual mapping application creates a new file (i.e., a player file) from the template file (step 340). Specifically, it makes a copy of the template file and imports data for such visual map into the data payload of the newly-created player file.

The visual mapping application then either (i) makes the player file available to a user or requesting software program (step 350a) or (ii) embeds the player file into a file type that is compatible with the external application, and makes the latter file available to a user or requesting software program (step 350b). For example, if the external application is a web browser, the player file may be embedded in a web page (e.g., an html file). If the external application is a PDF player, then the player file may be embedded in a PDF file. The player file also can be embedded in other types of files, such as word processing documents (e.g., .doc or .docx files), spreadsheet documents (e.g., .xls or .xlsx files), slide presentations (e.g., .ppt files), and generic computer automated files (e.g., .vsd files).

In an alternate embodiment, the method of FIG. 2, as well as steps 340-350a-b in FIG. 3, need not be performed by a visual mapping application. In other words, another type of application can perform these steps, as long as such application has access to visual mapping code that it (such application) can insert into a player file.

Figure 4:
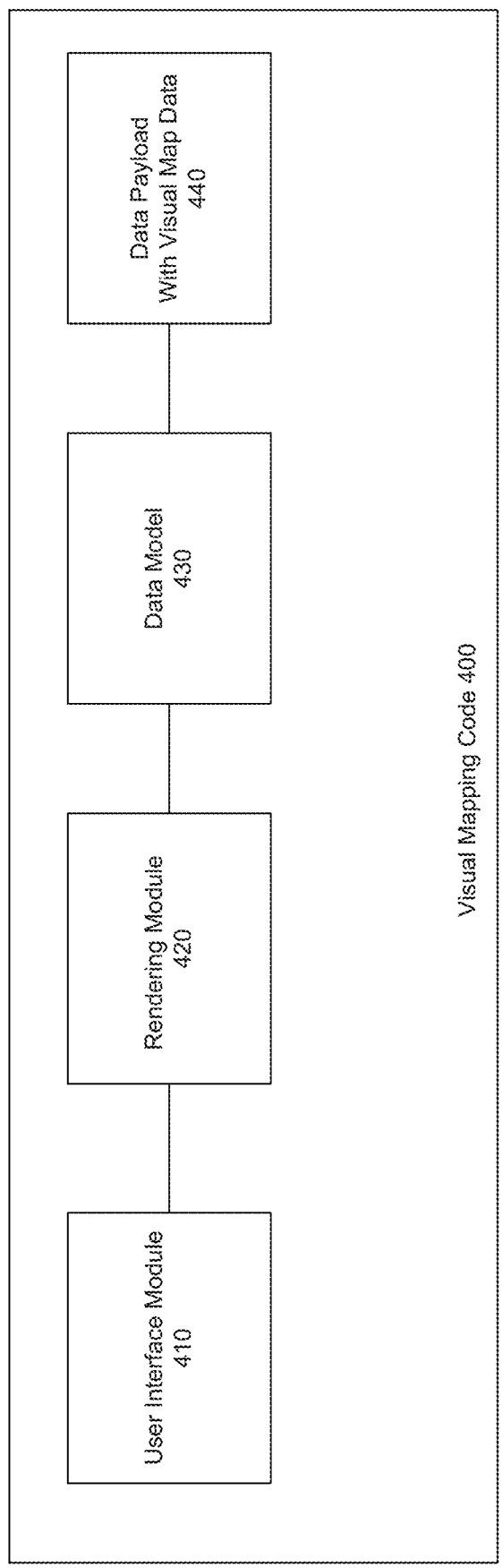
FIG. 4 is a block diagram that illustrates an example software architecture.

FIG. 4 illustrates an example architecture for the software code developed in step 310 for the player file. FIG. 4 is intended to be only an example, and the invention is not limited to the architecture displayed in FIG. 4.

In FIG. 4, the visual mapping code 400 includes a User Interface Module 410, a Rendering Module 420, a Data Module 430, and a Data Payload section 440. Visual map data is a loaded into the Data Payload Section 440. When the visual mapping code 400 is executed, the Data Module 440 specifies how data in the Data Payload 440 is translated into a visual map. The Rendering Module 420 is responsible for displaying the map (in accordance with the Data Module 440) within the external application. The User Interface Module 410 enables the user to interface with the visual map. For example, if a user clicks on a branch in the map to expand or collapse it, the User Interface Module provides such information to the Rendering Module which adjusts the map display accordingly.

In one embodiment, the visual mapping code in the player file is written in a software language that enables features such as animation and vector graphics. In the preferred embodiment, the visual mapping code 400 is written using ADOBE FLEX libraries and ADOBE ACTIONSCRIPT software language. In such embodiment, the player file created after the visual mapping code 400 is compiled is a SWF file. A SWF file can be executed by many types of external applications, including PDF players and web browsers. In alternate embodiment, the visual mapping code 400 is written using MICROSOFT SILVERLIGHT or Moonlight, which is an open source implementation of MICROSOFT SILVERLIGHT. In another alternate embodiment, the visual mapping code is written using Ajax (Asynchronous JavaScript and XML).

Figure 5:
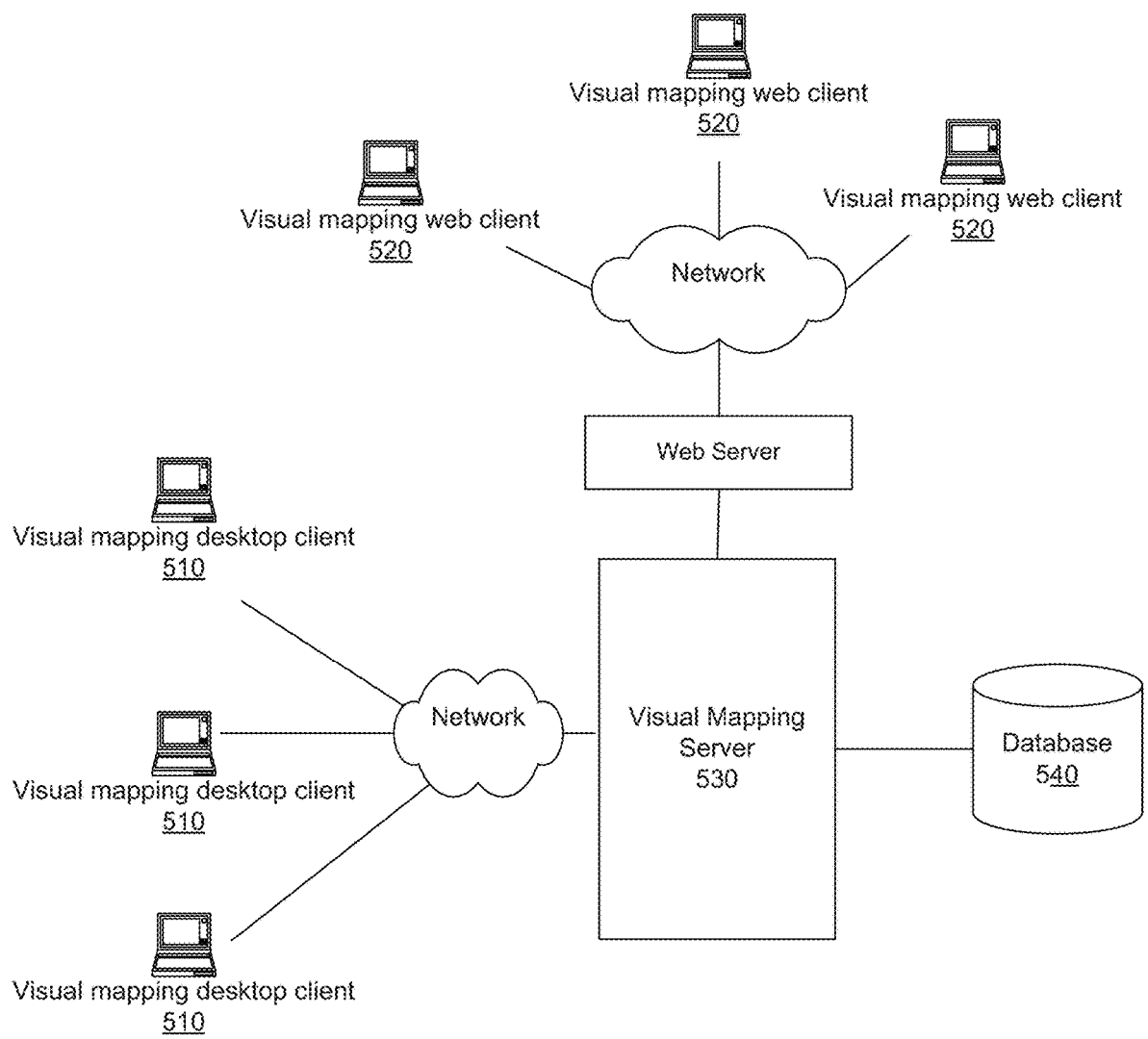
FIG. 5 is a block diagram that illustrates an example visual mapping system.

FIG. 5 illustrates an example of a visual mapping system 500 in which the present invention can be implemented. Visual mapping system 500 is only an example, and the invention is not limited to this example.

In system 500, a user can create visual map from a visual mapping desktop client 510 or a visual mapping web client 520. These visual mapping clients 510, 520 are served by a visual mapping server 530. Mindjet LLC's MINDJET CONNECT is an example of a visual mapping server application. After a user creates or edits a visual map, the visual mapping client (510 or 520) sends the map data to the visual mapping server 530, which stores the data in a file system or a database 540. A visual map can be stored as a file, or the topics in a map can be stored individually in a database, as described in U.S. patent application Ser. No. 12/001,533 titled "System and Method for Enabling a User to Search and Retrieve Individual Topics in a Visual Mapping System," which was filed on Dec. 12, 2007 and which is incorporated by reference as if fully disclosed herein.

In system 500, the template file with the visual mapping code referenced in FIGS. 2 and 3 is stored in a file system/database 540. When a user wants to create a player file, the user's visual mapping client 510 informs the visual mapping server 530 of the user's request. The visual mapping server 530 creates the player file, based on the template file, with the visual mapping code and the visual map data. The mapping server sends the visual mapping client 510/520 the player file, either by itself or as part of another file (such as a web page or PDF document).

Figure 6:
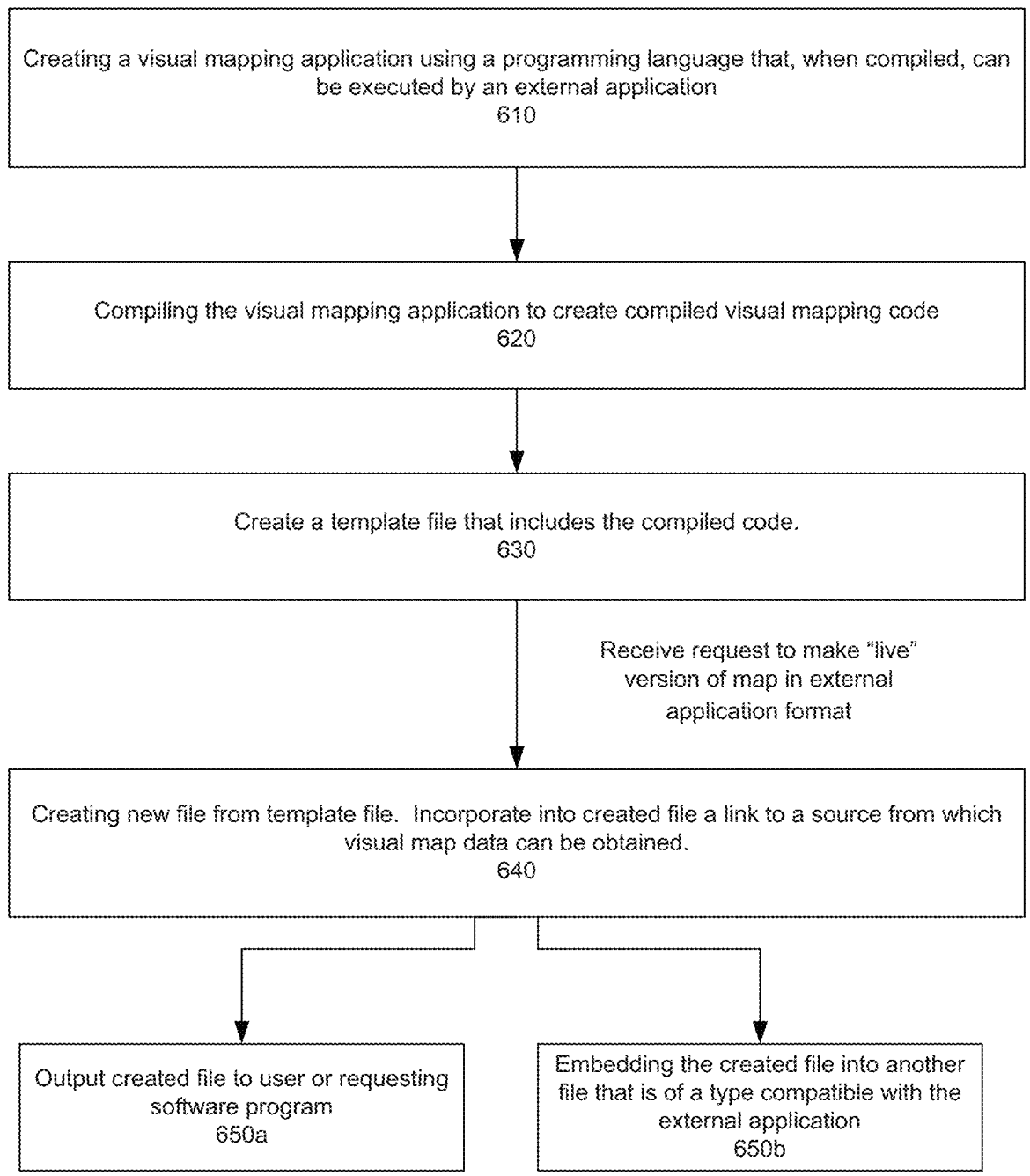
FIG. 6 is a flowchart that illustrates a method, according to an alternate embodiment of the present invention, for enabling a visual map to be viewed and interacted with in an external application.

FIG. 6 illustrates an alternate embodiment of the present invention. In the flow chart in FIG. 6, steps 610-630 and 650 are the same as steps 310-330 and 350. However, in step 640, instead of embedding all the visual map data into the player file, a link to visual map data (i.e., a network address) is embedded into the player file. The link can be a link to a published map or to a data service that dynamically generates visual map data from data obtained from a data source (e.g., a web search engine, a web server, a database, etc.). This enables the player file to obtain the most recent version of the visual map without altering the player file.

In one embodiment, the player file includes a link to a web service associated with a search domain (i.e., GOOGLE, YAHOO, etc.). The visual mapping functionality within such player file enables a user to enter search terms into the visual map displayed by the player file in the external application. After a user enters search term, the software code in the player file makes a call to the web service with the search terms and subsequently receives search results from the web service. The software code in the player file then display the search results in a visual map. A method for searching within visual maps is described in more detail in U.S. Patent Application titled "System, Method, and Software Application for Enabling a User to Search an External Domain within a Visual Mapping Interface," having inventors William J. Creekbaum, Michael B. Jetter, and Steven Bashford, and filed on Nov. 10, 2008, the contents of which are incorporated by reference as if fully disclosed herein. Also, a method for displaying data from a web service in a visual map is described in U.S. Patent Application titled "System, Method, and Software Application for Displaying Data from a Web Service in a Visual Map," having inventors William J. Creekbaum, Michael B. Jetter, and Steven Bashford, and filed on Nov. 10, 2008.

Figure 7:
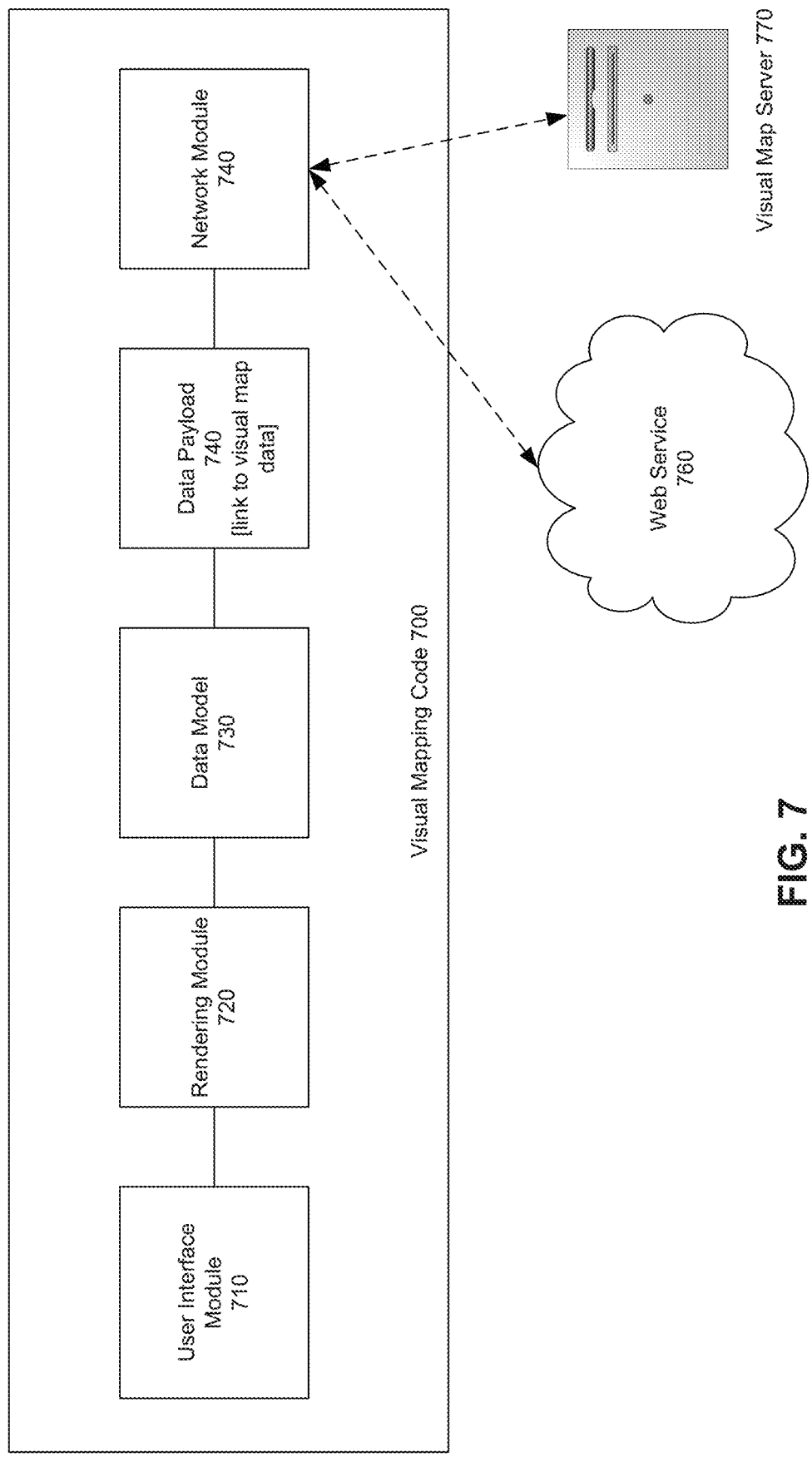
FIG. 7 is a block diagram that illustrates an example software architecture associated with such alternate embodiment.

FIG. 7 illustrates an example software architecture for visual mapping code in the player file in accordance with this alternate embodiment Like the visual mapping code in FIG. 4, visual mapping code 700 has a User Interface Module 710, a Rendering Module 720, and a Data Model 730, a Data Payload section 740. In addition, the visual mapping code 700 includes a Network Module 750. The Network Module 750 has the ability to communicate with a network, such as the Internet. The Data Payload section 740 includes a link to a network address from which visual map data can be obtained. For example, the link can be a link to a visual map on a visual map server 770 or a web service 760. The map can be a published map or one that is dynamically generated by a web service or a visual map server.

When the player file is run within the external application, the Network Module 750 retrieves the link from the Data Payload section 740 and requests visual map data from a service/service at the link. When the Network Module 750 receives the requested visual map data from the server/service at the link, it loads such data into the Data Payload section 740. In the preferred embodiment, the visual map data returned by the web service or a visual mapping server is in XML format, although the invention is not limited to XML format. Other text-based formats can be used (e.g., JSON), as well as proprietary binary formats.

Figure 8:
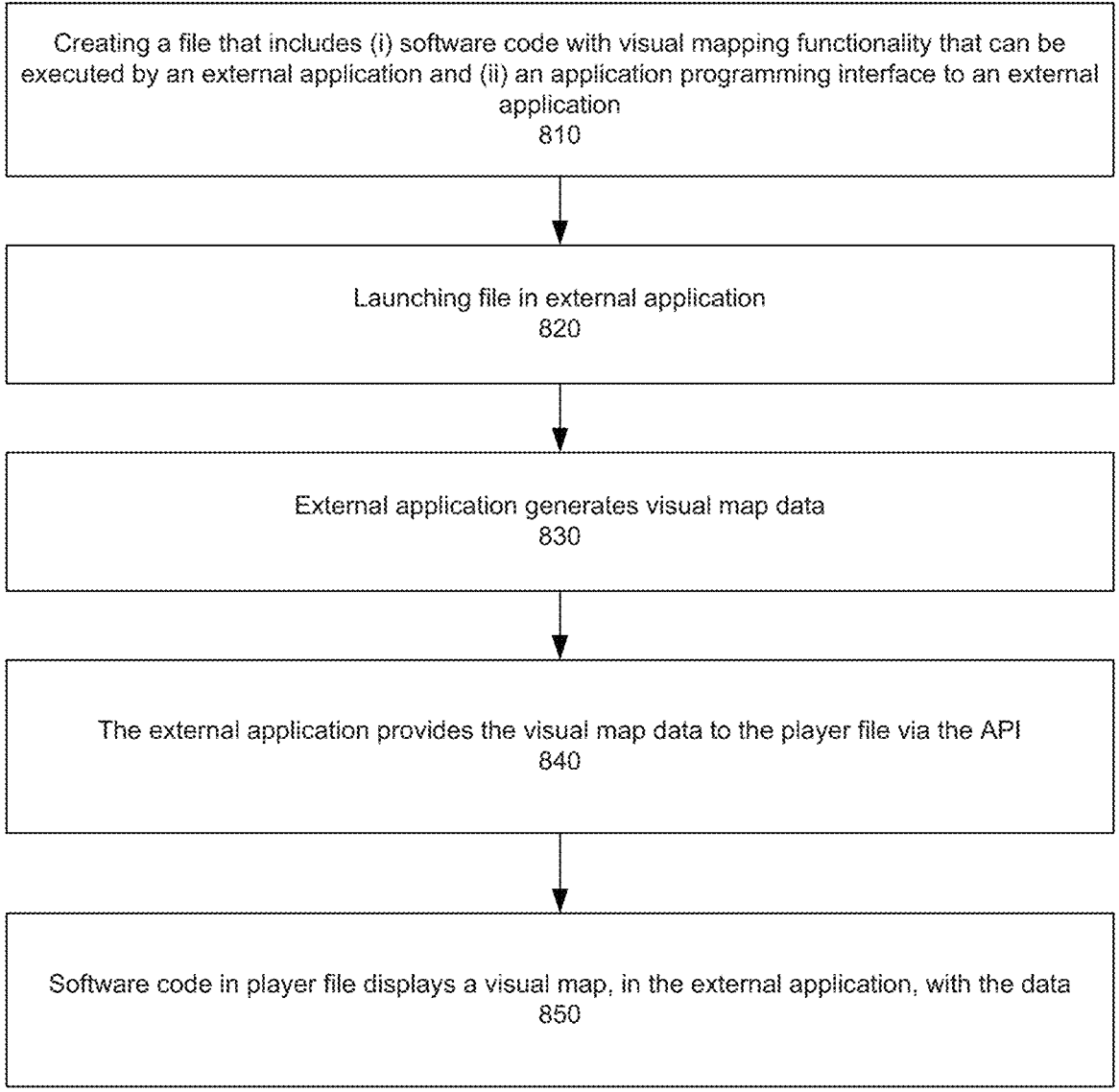
FIG. 8 is a flowchart that illustrates a method, according to another alternate embodiment of the present invention, for enabling a visual map to be viewed and interacted with in an external application.

In another alternate embodiment of the invention, the external application generates visual map data and inserts the data into a player file. This embodiment is described with respect to FIGS. 8 and 9. Referring to FIG. 8, this embodiment involves creating a file (a player file) that includes (i) software code with visual mapping functionality that can be executed by an external application and (ii) an application programming interface (API) to an external application (step 810). The player file is subsequently launched in the external application (step 820), and the external application generates visual map data for the player file (830). Via the API, the external application provides the visual map data to the player file (840), and the software code in the player file displays a visual map, in the external application, with the data (850). The external application may provide visual map data to the player file only upon launching the player file, or, alternately, it may continuously, frequently, periodically, or occasionally update the visual map data while the player file is open within the external application. For example, if the external application provides the player file with stock quotes, the external application may continuously update the visual map with new stock quotes while the applicable stock market is open.

Figure 9:
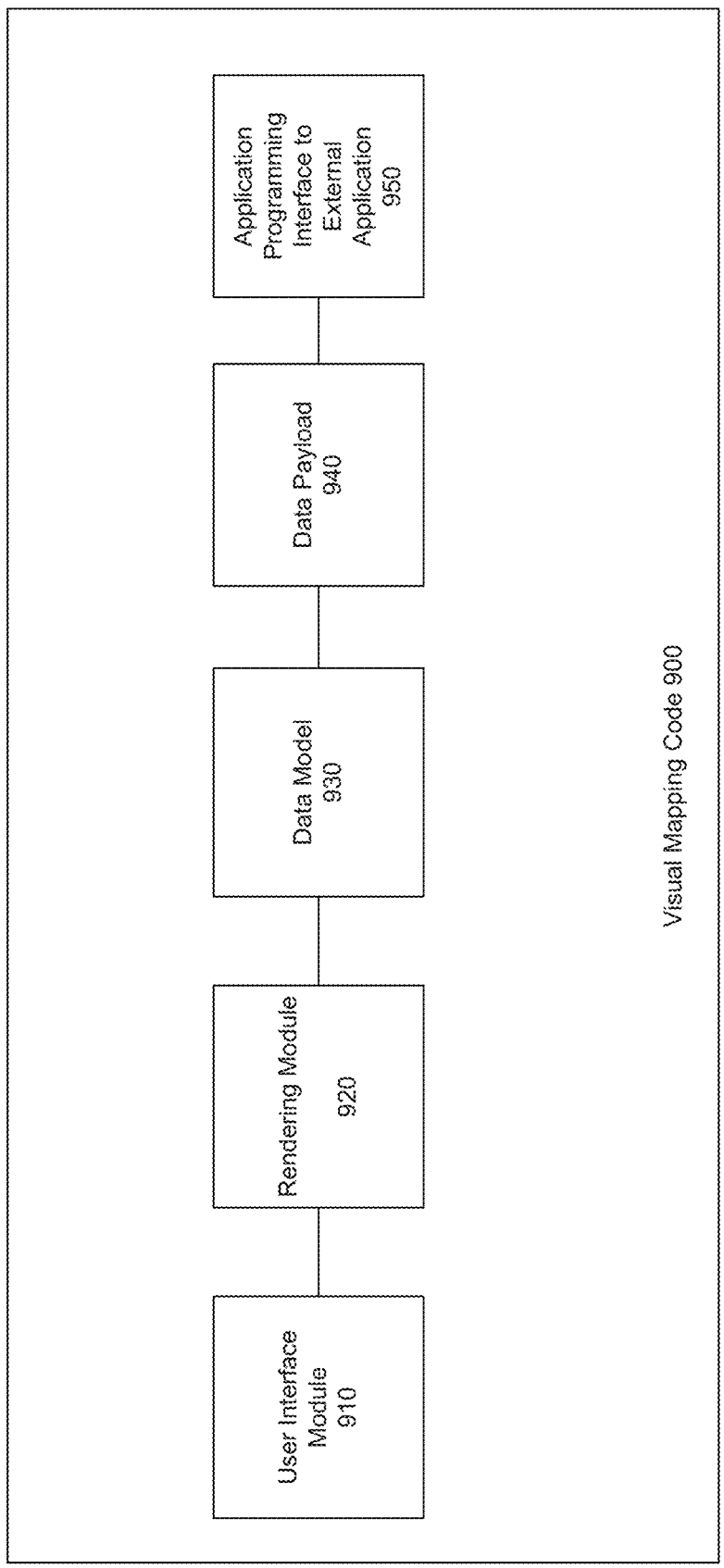
FIG. 9 is a block diagram that illustrates an example software architecture associated with such other alternate embodiment.

FIG. 9 illustrates an example of software architecture for visual mapping code (in the player file) in accordance with this embodiment. This embodiment is not limited to this example.

Like the visual mapping code in FIG. 4, visual mapping code 900 has a User Interface Module 910, a Rendering Module 920, and a Data Model 930, a Data Payload section 940. In addition, the visual mapping code 900 includes an Application Programming Interface (API) 950 that interfaces with the external application. The external application initiates the player file by sending visual mapping data to the API 950. The API 950 loads visual map data into the Data Payload module 940.

As will be understood by those familiar with the art, the invention may be embodied in other specific forms without departing from the spirit or essential characteristics thereof. Accordingly, the above disclosure of the present invention is intended to be illustrative and not limiting of the invention.

What is claimed is:

1. A method comprising:
    executing a first software application upon a computer comprising at least a first microprocessor, a display, and a user input interface for receiving inputs generated by a first user of the computer;
    receiving, via the a user input interface, first input data relating to a request for generation of a visual map within the first software application;
    providing the first input data to a second software application in execution upon a second computer comprising at least a second microprocessor;
    retrieving, with the second microprocessor, visual map data from a first memory accessible to the second computer, the visual map data being established by the second microprocessor in dependence upon the first input data;

creating a template file comprising executable instructions and a data payload section that includes space to store the visual map data;

generating, with the second microprocessor, visual mapping code comprising a first portion comprising software code executable within a third software application and a second portion comprising the visual map data, wherein generating the visual mapping code comprises copying the template file to generate the first portion and loading the visual map data into the data payload section to generate the second portion;

accessing and executing the visual mapping code with the third software application;

wherein the visual mapping code when executed in the third software application by the first microprocessor performs the following steps:

render a visual map interface upon the display within the first software application;

render the visual map data as the visual map within the user input interface; and receive via the user input interface, second input data relating to a functionality of a plurality of functionalities of the visual map interface to be performed with respect to the visual map rendered to the first user; and perform selected functionality of the plurality of functionalities with respect to the visual map rendered within the visual map interface, wherein the plurality of functionalities are defined by and built within the visual mapping code, and the visual map is one of a mind map, a topic map, a semantic network, or a concept map.

2. The method according to claim 1, wherein the functionality comprises at least one of expanding or collapsing a topic of a plurality of topics within the visual map interface; and the topic of the plurality of topics is established in dependence upon the visual map data.

3. The method according to claim 1, wherein the functionality comprises navigating via one or more hypertext links rendered within the visual map interface.

4. The method according to claim 1, wherein the functionality comprises providing the first user with means to find content within the visual map data.

5. The method according to claim 1, wherein the visual map code generated by the second microprocessor and accessed and executed with the third software application is embedded by the second microprocessor within a file having a file type compatible with the first software application.

6. The method according to claim 5, wherein the third software application is a web browser and the file is a hypertext marked up language file.

7. The method according to claim 5, wherein the third software application is a viewer of documents and the file is a portable document format.

8. The method according to claim 5, wherein the third software application is one of a word processor, a spreadsheet, and a slide presentation application.

9. The method according to claim 5, wherein the file type is a generic computer automated file.

10. The method according to claim 1, wherein the third software application does not support visual map functionality absent the visual mapping code.

11. The method according to claim 1, wherein the visual map data comprises a link to a network address from which actual visual map data to be rendered to the first user can be obtained from.

12. The method according to claim 1, wherein the visual mapping code is generated, retrieved, and executed once in response to the request for generation of the visual map within the third software application.

13. The method according to claim 1, wherein the visual mapping data is provided continuously whilst the visual map interface is open within the third software application.

14. The method according to claim 1, wherein the visual mapping code is generated, retrieved and executed periodically whilst the visual map interface is open within the third software application.

15. The method according to claim 1, wherein the visual mapping code is generated, retrieved and executed occasionally whilst the visual map interface is open within the third software application.

16. The method according to claim 1, wherein the functionality of the plurality of functionalities comprises adding to the visual map data, moving a first portion of the visual map data, or deleting a second portion of the visual map data within the visual map.

17. The method according to claim 1, wherein the first portion of the visual mapping code comprises a user interface module, a rendering module, and a data module; the user interface module enables the plurality of functionalities and provides information to the rendering module; and the rendering module is responsible for rendering the visual map in accordance with the data module within the first software application.

18. The method according to claim 1, wherein the first portion of the visual mapping code comprises a user interface module, a rendering module, a data module, and a network module; the user interface module enables the plurality of functionalities and provides information to the rendering module;

the rendering module is responsible for rendering the visual map in accordance with the data module within the third software application; and the network module supports communications with a network allowing data to be transmitted from and received by the visual map interface.

19. The method according to claim 1, wherein the first portion of the visual mapping code comprises a user interface module, a rendering module, a data module, and a network module; the user interface module enables the plurality of functionalities and provides information to the rendering module;

the rendering module is responsible for rendering the visual map in accordance with the data module within the third software application; and the network module supports communications with a network such that where the second portion of the visual mapping code is a link to a network address the visual map data can be obtained from the network address.

20. The method according to claim 1, wherein the first portion of the visual mapping code comprises a user interface module, a rendering module, a data module, and an application programming interface (API);

the user interface module enables the plurality of functionalities and provides information to the rendering module;

the rendering module is responsible for rendering the visual map in accordance with the data module within the third software application; the API interfaces with an external software application such that the external software application initiates generation of the visual mapping code by sending the visual map data to the API which loads the visual map data to the data module; and the data module loads the visual map data to the data payload section.

21. The method according to claim 1, wherein the functionality of the plurality of functionalities comprises providing the first user with the means to enter a search term into the visual map; and upon identifying entry of the search term the visual mapping code performs the steps of: making a call to a web service comprising at least the search term; receive search results from the web service; and render the search results in at least one of a new visual map and the visual map.

22. The method according to claim 1, wherein the visual map data is a link to a network address from which actual visual map data to be rendered to the first user can be obtained from; and the link is a published visual map.

23. The method according to claim 1, wherein the visual map data is a link to a network address from which actual visual map data to be rendered to the first user can be obtained from; and the link is to at least one of a web search engine, a web server, and a database.

24. The method according to claim 1, further comprising accessing and executing a second visual mapping code with the third software application; and wherein the second visual mapping code was generated by a second user using a visual mapping client which causes a visual mapping server to generate the second visual mapping code using data specified by the second user.

25. The method according to claim 24, wherein the data specified by the user forms the second portion of the second visual mapping code; and the first portion of the second visual mapping code was generated by the visual mapping server in dependence upon the template file.

26. The method according to claim 1, wherein the first and second portion of the visual mapping code was generated in dependence upon the template file.

27. The method according to claim 1, wherein receiving, via the user input interface, first input data relating to the request for generation of the visual map within the first software application comprises receiving first input data relating to the third software application; wherein the visual mapping code comprises software code to implement functionality; and an external application provides the visual map data to be displayed within the visual map via the API.

28. The method according to claim 1, wherein the first software application and the third software application are the same software application.

29. The method according to claim 1, wherein the first software application is a visual mapping application; and the third software application is an external application to the visual mapping application.

30. The method according to claim 1, wherein the third software application is a visual mapping application external to the first software application.

31. The method according to claim 1, wherein the first software application is a visual mapping application; and the third software application is one of a portable document application, a word processing application, a spreadsheet application, a presentation application, a computer-aided drawing application, and a web browser.

* * * * *